United States Patent [19]
Curtis

[11] Patent Number: 5,161,821
[45] Date of Patent: Nov. 10, 1992

[54] SIDE IMPACT AIRBAG SYSTEM ATTACHED TO SEAT BELT

[75] Inventor: Cass V. Curtis, Dover, N.H.

[73] Assignee: Davidson Textron Inc., Dover, N.H.

[21] Appl. No.: 759,519

[22] Filed: Sep. 13, 1991

[51] Int. Cl.$^5$ .................. B60R 21/18; B60R 21/22
[52] U.S. Cl. .................. 280/730; 280/733; 280/743
[58] Field of Search .............. 280/733, 730, 743, 751, 280/728

[56] References Cited

U.S. PATENT DOCUMENTS

| | | | |
|---|---|---|---|
| 3,706,462 | 12/1972 | Lilly | 280/733 |
| 3,865,398 | 2/1975 | Woll | 280/733 |
| 3,975,258 | 8/1976 | Fox | 280/733 |
| 5,062,662 | 11/1991 | Cameron | 280/733 |

FOREIGN PATENT DOCUMENTS

| | | | |
|---|---|---|---|
| 2245718 | 3/1974 | Fed. Rep. of Germany | 280/733 |
| 2922587 | 12/1980 | Fed. Rep. of Germany | 280/751 |

Primary Examiner—Margaret A. Focarino
Assistant Examiner—Tamara L. Graysay
Attorney, Agent, or Firm—Reising, Ethington, Barnard, Perry & Milton

[57] ABSTRACT

An airbag canister and sensor and gas deployment unit attached to the lap belt portion of an automotive three-point seat belt system, wherein the lap belt portion is attached at one end thereof to the sill at the base of the center pillar. The airbag components are positioned adjacent the outside edge of the front seat, and intermediate the hip portion of the occupant and the vehicle door. When the seat belt is not in use, the airbag components assume a stowed position along side the center pillar intermediate the base and the usual upper shoulder belt dispenser, providing for easy entry and egress by the operator or passenger.

3 Claims, 1 Drawing Sheet

SIDE IMPACT AIRBAG SYSTEM ATTACHED TO SEAT BELT

TECHNICAL FIELD

This invention relates generally to automotive side impact protection apparati and more particularly, to a side impact airbag system attached to the seat belt.

BACKGROUND ART

While various side impact airbag system protection apparati are known, none are known to be operative in conjunction with the lap belt portion of a conventional three-point seat belt system. Inflatable seat belts are known for affording added protection in the event of a frontal impact, for example, Abe et al U.S. Pat. No. 3,933,370; Granig U.S. Pat. No. 3,801,156; and Law et al U.S. Pat. No. 4,348,037.

Other arrangements known to be associated with seat belts include Weightman et al U.S. Pat. No. 4,795,190; Otageui-Ugarte U.S. Pat. No. 3,941,404; and Pennock U.S. Pat. No. 4,886,318, but none of these are specifically directed to protection of the occupant in a side impact situation.

Weightman et al disclose tubular covers around lap and shoulder belts for comfort while wearing the belts, and a minicover around the shoulder belt adjacent the neck and shoulder of the user to encourage seat belt use.

Otaegui-Ugarte discloses an air inflatable chest protector operatively connected to the safety belt adjacent the user's thorax and abdomen.

Pennock discloses attachments for each twin shoulder belts, lap belts, and crotch belts, consisting of an elongated foam body and a fabric sleeve having a passage formed therethrough to permit free movement of the various safety belt portions.

Side airbag systems not associated with the seat belt arrangement include Warner et al U.S. Pat. No. 4,966,388; Putsch U.S. Pat. No. 4,946,191; Bertrand U.S. Pat. No. 2,834,606; and Leising et al U.S. Pat. No. 3,897,961.

Werner et al disclose a side impact airbag mounted between the walls of the vehicle door, with sensors positioned just inside the outer wall of the door. In the event of a side impact, the sensors cause the airbag to inflate upwardly, pushing a pivotally mounted cushioning panel serving as the finished inboard wall into contact with the occupant's torso, while the airbag covers the window area.

Putsch provides an airbag and actuating device mounted in a laterally extending side member or wing formed on each side of a vehicle seat at about the shoulder height of the occupant of the seat. Upon a side impact the airbag inflates to fill the space between the head of the occupant and the adjacent window.

Bertrand discloses an overhead side bag deployment system which, upon a side impact, will direct the inflated airbag downwardly between the occupant and the door.

Leising et al disclose, along with torso restraining bags, an inflatable side curtain, normally maintained in a folded condition in the vehicle roof area, which, when inflated, extends across the side window adjacent the occupants head and shoulder.

DISCLOSURE OF THE INVENTION

A general object of the invention is to provide an improved automotive side impact protection apparatus.

Another object of the invention is to provide an improved side impact protection apparatus which is adaptable to the lap belt portion of a typical three-point seat belt system wherein the lap belt is fixed at the base of the center pillar of the vehicle, and the shoulder belt reels into a dispenser at the top of the pillar, with the buckle stowed adjacent the dispenser.

A further object of the invention is to provide an airbag system fixedly attached to the lap belt such that the canister fits into the space alongside the user's hip adjacent his or her waist, and the sensor and gas deployment unit fits between the seat and the door.

Still another object of the invention is to provide an airbag system fixedly attached to the lap belt intermediate the vehicle door and the vehicle operator or passenger such that, upon a side impact, a bifurcated airbag is deployed upwardly, both in front of and behind the operator's or passenger's arm, to come together adjacent the user's head.

These and other objects and advantages will become more apparent when reference is made to the following drawings and the accompanying description.

BEST MODE OF CARRYING OUT THE INVENTION

Figure 1:
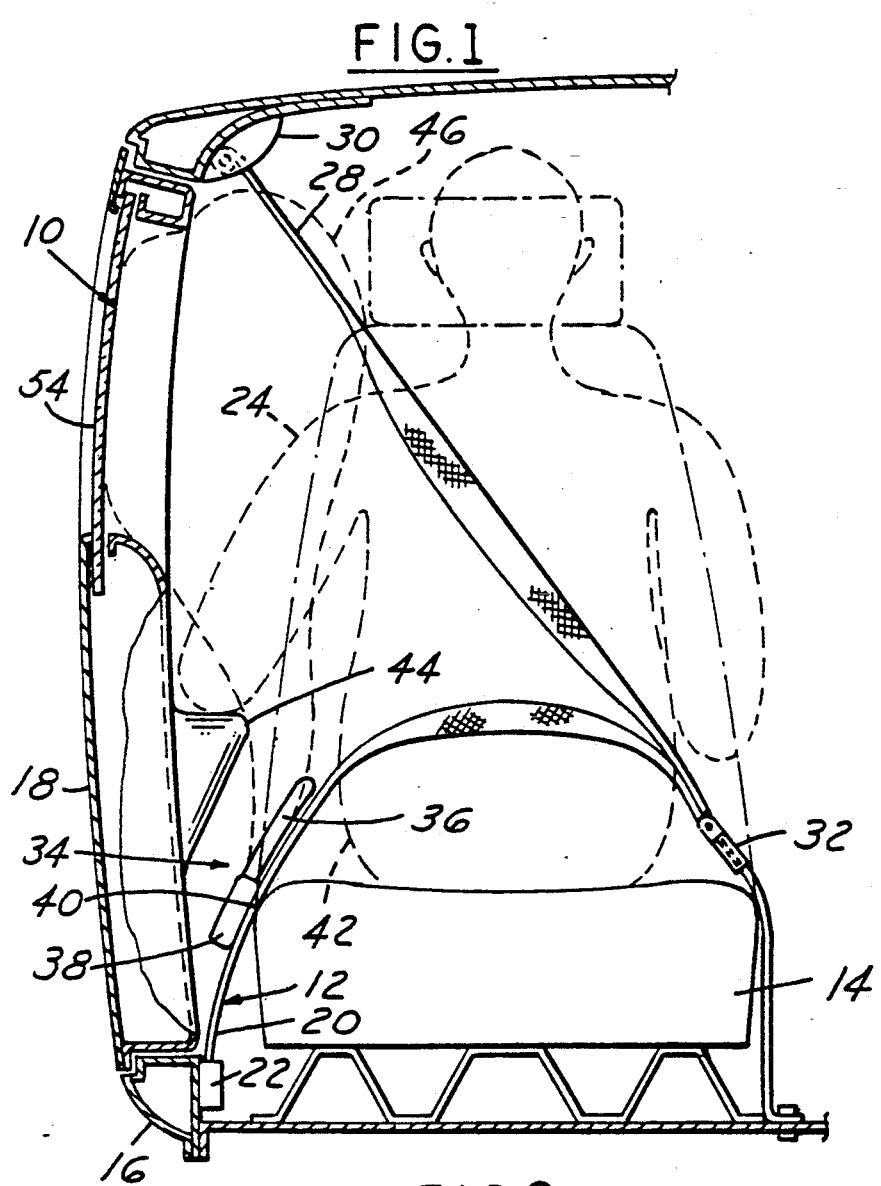
FIG. 1 is a fragmentary end view of a vehicle three-point seat belt system embodying the invention.

Referring now to the drawings in greater detail, FIG. 1 illustrates an automotive side impact protection apparatus 10 for use with a conventional three-point seat belt system 12, in conjunction with a front seat 14, a door sill 16, and a door 18. A lap belt portion 20 of the conventional three-point seat belt system 12 is secured at one end thereof by a suitable fastener 22 to the usual rocker panel or sill 16. The vehicle occupant seated on the seat 14 is represented as 24.

Figure 2:
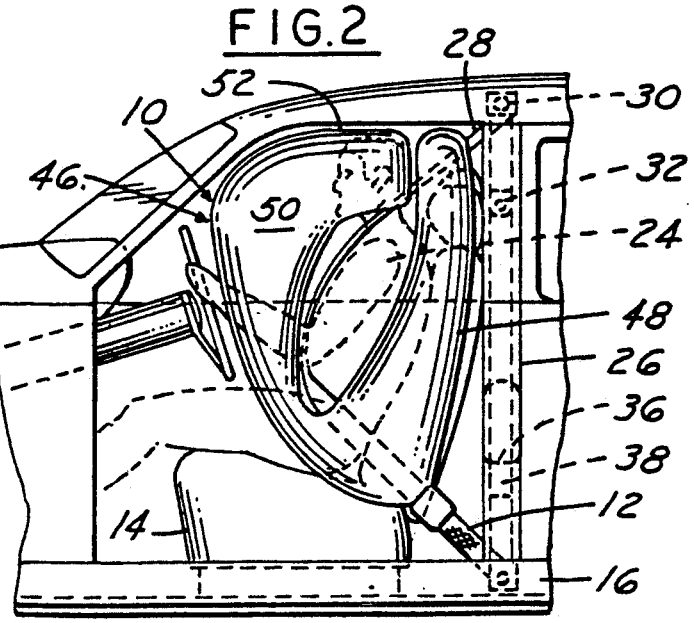
FIG. 2 is a fragmentary side elevational view of the FIG. 1 structure, with the door removed.

As shown in FIG. 2, the fastener 22 on the sill 16 is positioned at the base of the usual center pillar 26. The shoulder belt portion 28 of the seat belt system 12 reels into a typical dispenser, represented as 30, at the top of the center pillar 26, with a typical buckle 32 stowed, when not in use, adjacent the dispenser 30.

An airbag system 34, including a canister 36 and a sensor and gas deployment unit 38, is fixedly secured around the lap belt portion 20 of the seat belt system 12, adjacent an edge portion 40 of the front seat 14, the canister 36 being positioned intermediate the hip 42 of the occupant 24 and the inner surface of the door 18, and the unit 38 being positioned intermediate the side of the seat 14 and the door 18, just below an armrest 44 commonly mounted on the inner surface of the door.

As viewed in FIG. 2, the height of the canister 36 is from the edge portion 40 of the seat 14 to approximately the belt line of the occupant 24.

The triggering mechanism (not shown) is a typical state-of-the-art unit, but adapted to being triggered only upon a side impact.

As shown in FIG. 2, the airbag 46, which is deployed upwardly from the canister 36 upon a side impact activating the triggering mechanism, is a bifurcated type having a rearward portion 48 (FIG. 2) extending upwardly behind the occupant's arm, and a forward portion 50 extending upwardly in front of the occupant's arm. The forward portion 50 is shown to include a rearwardly extending segment 52 at the top thereof, such that the latter segment 52 extends intermediate the occupant's head and the window 54 of the door 18, to thereby protect the occupant's head.

As shown in phantom lines in FIG. 2, when not in use the airbag system 34 has moved with the lap belt portion 20 to a mid location along the center pillar 26, out of the way, for easy entry and egress by the operator or passenger.

INDUSTRIAL APPLICABILITY

It should be apparent that the invention provides an efficient side impact airbag system attachment to a lap belt which serves, in the event of a side impact, to inflate upwardly, both in front of and behind the occupant's outermost arm, but coming together adjacent the occupant's head, providing cushioning between the occupant and the inner door panel to reduce the movement of the door toward, and the resultant forces on, the occupant.

It should also be apparent that the invention is not cumbersome and does not interfere with the vehicle operator, and is stowable alongside the center pillar, out of the way, for easy entry and egress by the operator or passenger.

While but one embodiment configuration has been shown and described, other modifications thereof are possible within the scope of the following claims.

The embodiments of the invention in which an exclusive property or privilege is claimed are defined as follows:

1. A side impact protection apparatus for use with a lap belt portion of a seat belt secured to a door sill at the base of a center pillar adjacent an automotive front door by a vehicle occupant seated on a vehicle front seat and having the lap belt portion secured across his or her lap, said apparatus comprising an airbag system fixedly mounted around the lap belt portion in the space intermediate said front door and the hip of said occupant, wherein said airbag is a bifurcated type wherein a rearward portion thereof extends upwardly behind the occupant's outermost arm upon a side impact, and a forward portion thereof extends upwardly in front of the occupant's arm upon the side impact.

2. The apparatus described in claim 1, wherein said forward portion of said bifurcated airbag includes a rearwardly extending segment at the upper end thereof adapted to extending intermediate the occupant's head and the adjacent automotive door.

3. A side impact protection apparatus for use with a lap belt portion of a seat belt secured to a door sill at the base of a center pillar adjacent an automotive front door by a vehicle occupant seated on a vehicle front seat and having the lap belt portion secured across his or her lap, said apparatus comprising an airbag system fixedly mounted around the lap belt portion in the space intermediate said front door and the hip of said occupant, wherein said airbag is a bifurcated type wherein a rearward portion thereof extends upwardly behind the occupant's outermost arm upon a side impact, and a forward portion thereof extends upwardly in front of the occupant's arm upon the side impact, wherein said airbag system includes a canister containing an airbag, and a sensor and gas deployment unit, each fixedly secured to said lap belt portion, the canister being uppermost and positioned just above the side edge of the vehicle front seat, intermediate the hip of the occupant and said front door.

* * * * *